United States Patent Office 2,799,295
Patented July 16, 1957

2,799,295

WEAVING DEVICE

Yves Juillard, Mulhouse, and Jacques Juillard and Jean Pierre Juillard, Paris, France Application January 8, 1953, Serial No. 330,245

11 Claims. (Cl. 139—12)

The present invention relates to looms in which no reciprocating movements are imparted to the shuttles and in which a plurality of weft threads may be simultaneously deposited.

The typical ordinary loom has the advantage of being simple and of providing a fabric of a good quality. On another hand it has the disadvantage of permitting only a comparatively small production owing to the reciprocating movement imparted to the shuttle, since the inertia of the parts with respect to the reciprocating movement limits the working speed. Furthermore, in order to attain maximum production, very high speed must be imparted to the shuttle itself, which high speeds entail danger of breaking the weft. So-called shuttleless looms have been made in which a picked clamp or drawing hooks for the weft thread or a pneumatic projection of the latter are used. However, while they reduce the opening of the shed and, consequently, the causes of breaking the warp, these constructions do not make it possible to reduce the passing speed of the weft threads owing to the fact that it is necessary to wait until a weft thread is in place before the warp threads may be crossed.

In order to do away with the reciprocating movement of the shuttles and to reduce the circulation of the weft threads, circular looms have been proposed. The latter provide a tubular fabric and owing to the fact that it is necessary to divide the heads into small elements, it becomes possible to cross the warp threads immediately after the passage of a shuttle and, therefore, to increase the number of the shuttles per unit of woven width and, consequently, to increase the production for a given shuttle speed. However, the circular looms have great disadvantages, among which are difficulty of stretching the fabric in the width, difficulty of automatically changing the shuttles, inaccessibility to the inner part, the inertia of the heads, and the unequal tension of the warp threads. The problem of the selvedges, for example, further remains unsolved.

The present invention has for its object to provide a loom for enabling use of a weaving method which has certain advantages of the method which is already used in the typical ordinary looms and in the circular looms, but which is devoid of their disadvantages.

The weaving method performed by looms in accordance with the invention fundamentally consists in forming a rectilinear sheet or a sheet in the shape of an arc of a circle with the warp threads of the fabric to be produced, in causing a plurality of cops each carrying a weft thread to circulate, one behind the other, always in the same direction, through a shed opened in the sheet, while holding each weft thread fast when it enters the shed and unwinding it in the measure as the corresponding cop moves forward, the shed being closed and then re-opened behind each cop in accordance with the weave pattern and then in re-loading a weft thread on each cop after its exit from the shed and before it re-enters the latter for a new passage.

The cops may thus always circulate in the same direction, and this suppresses the major part of the reciprocating parts. A very large number of weft threads may be simultaneously deposited, and each cop may be only of a very small thickness which makes it possible to reduce the width of the shed opening and, consequently, the effects of the inertia of the healds and the breakings of the warp. The healds may be actuated through a dobby having a continuous movement.

A loom for practicing the above defined method may fundamentally comprise a rectilinear warp beam and a fabric receiving roll, also rectilinear, between which a dobby is interposed and which includes a helical cam so arranged as to control the movement of the healds, each of which carries a warp thread, a plurality of cops each capable of receiving a weft thread, a continuous conveyor arranged in order to bring the cops to the sheet formed between the warp beam and the fabric receiving roll and to carry them out of the shed, a device co-operating with a conveyor for insuring the continuous loading of the cops and a device for carrying the cops away at a distance inside the shed formed by the warp threads.

The sheet which is being woven is preferably arranged vertically and a fabric pulling roll is advantageously provided above the receiving roll.

The cops preferably consist of small flat discs, the conveyor being formed of a flexible band provided with studs capable of being received in holes of a corresponding shape provided in the axis of the cops, the band co-operating with a counter-guide-plate so arranged as to maintain the cops on the band, the counter-guide-plate being omitted in the length of the shed.

The device for conveying the cops through the shed may consist of a continuous band, a side of which runs parallel to the shed against the latter and which carries magnets which may be permanent magnets or electro-magnets secured to the band and spaced at regular intervals equal to the interval between two consecutive cops of the cop conveying band.

The device which makes it possible to re-load the cops after their passage through the shed may consist of a circular plate on the periphery of which the cop conveyor band engages and which includes, at its periphery, recesses which are open outwardly and which are arranged at intervals corresponding to that of the cops on the conveyor band and in which a driving head is arranged which is capable of coming into contact with the cops when they are brought against the plate through the conveyor band, the driving head being mounted at the end of a radial shaft cooperating with a fixed member capable of rotating the head in the course of the rotation of the plate, the latter carrying a support on and which bobbins are mounted which carry the weft threads.

Other features of the loom in accordance with the invention will appear from the following description with reference to the accompanying drawings in which.

Figure 1:
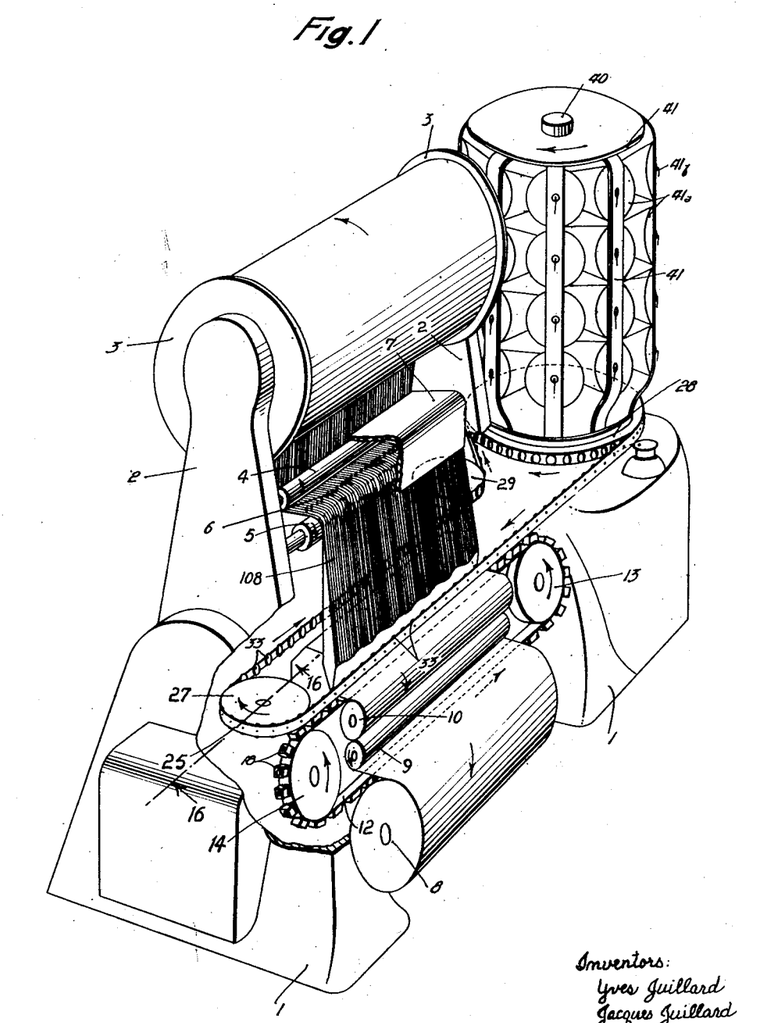
Fig. 1 is a simplified perspective view of a loom constructed in accordance with the invention.
Figures 2, 3:
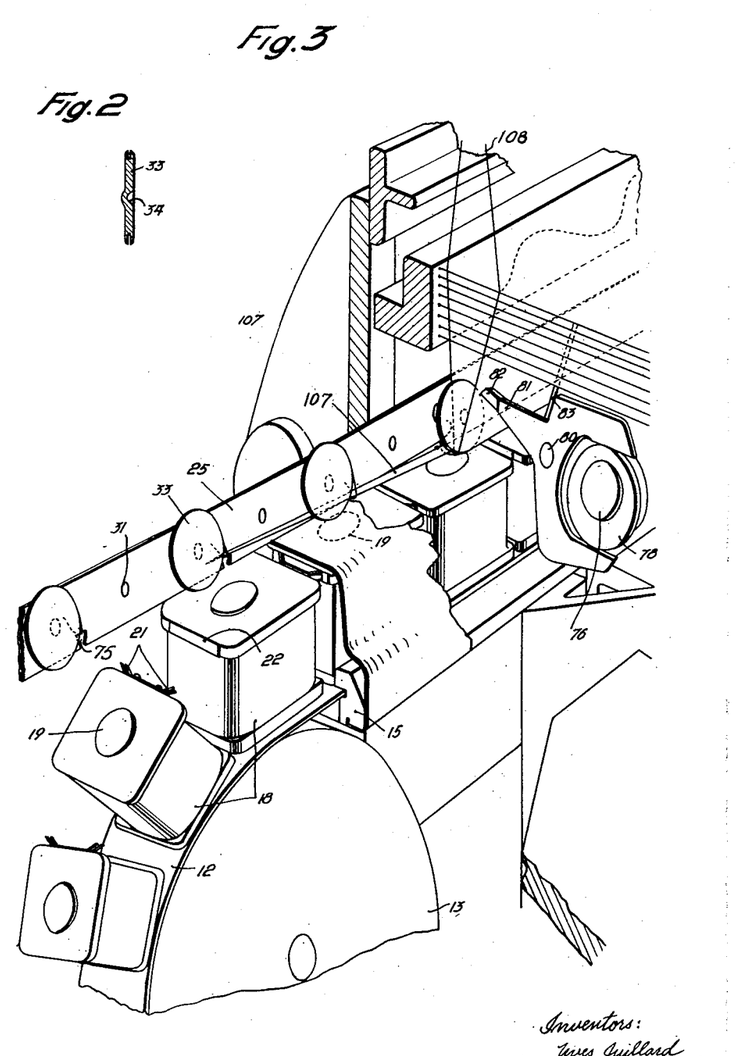
Fig. 2 is a sectional view of a cop.
Fig. 3 is a perspective view from behind of the cops entering the warp.

Referring to the drawings, the embodiment of the loom which is shown for illustrative purposes comprises a frame 1 in the upper part of which two arms 2 are arranged, and which support a warp beam 3. Mounted between the arms 2, which may be arranged so as to be able to pivot and deposit the assembly on the ground and for facilitating its loading, are two guide-rolls 4 and 5 as well as a warp stop motion device 6 of a known type, the whole being covered by a housing 7. Mounted at the lower part of the frame 1, is a roll 8 intended to receive the finished fabric, a return roll 9 and a pulling roll 10 being mounted above said roll 8 and a longitudinal plate 11 being arranged in a plane which is substantially tangent to the pulling roll 10 in order to insure the change of direction of the fabric in the measure as it is formed, the inner edge of this plate 11 being substantially plumb with roll 5.

Arranged in a vertical plane passing through the inner edge of the plate 11 and below the latter, is an endless band 12 passing on each side of the free interval provided in the frame for the passage of the fabric on two pulleys 13 and 14 rotatably mounted on the frame on horizontal axes. The upper side of this band 12 is guided parallel with the plate 11 by means of two side rails 15 fastened on a crosspiece 16 of the frame 1. Secured at regular intervals on the outer face of the band 12 by means of bolts 17, are electro-magnets 18, the core 19 of which being so dimensioned as to present its free end immdiately above the inner edge of the plate 11. One of the ends of the winding of each of the electromagnets is connected with a contact-brush 20 fast on the bottom of the electromagnet and with a resilient contact 21 which is arranged on the rear of the upper part of an electromagnet and faces in the direction opposite to the movement of the band 12, whereas the other end of the winding is connected to a contact plate 22 arranged in front of the upper part of the electromagnet. These windings are arranged, from one electromagnet to the next opposite, alternately in one direction so that the poles of two adjacent electromagnets are inverted.

Fixed contact-pieces 23 and 24 are connected to both terminals of a direct current source respectively. The length of the contact pieces is larger than the distance between the axes of two consecutive electromagnets and they are insulatingly secured at both ends of one of the rails 15 in order to cooperate with the contact brushes 20.

A second endless metallic band 25 is mounted so as to pass vertically above the plate 11, a groove 26 being formed in the plate in order to insure the guiding of the band 25. This latter band passes about a pulley 27 rotatably mounted around a vertical axis on the frame 1 on one side of the latter, and around a plate 28 also rotatably mounted around a vertical axis at the other end of the frame 1 by means of rollers as will be explained later. An idler pulley 29 insures the parallelism between both sides of the band 25.

Figure 6:
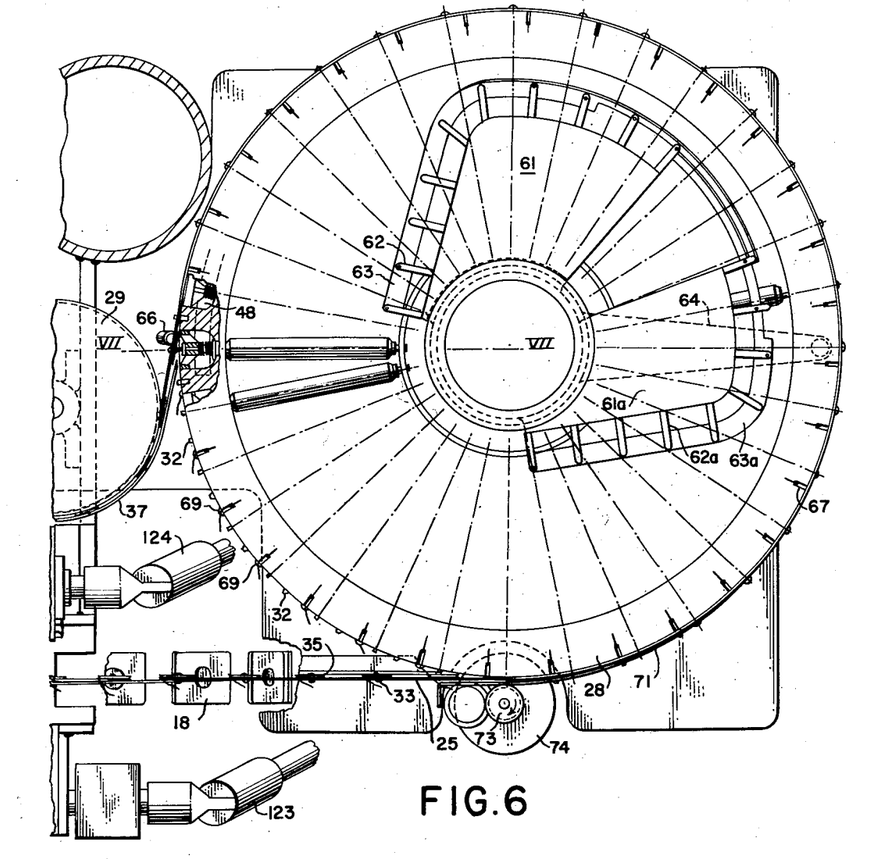
Fig. 6 is a plan view of the plate for the loading of the cops.

The band 25 carries, on its inner face, small conical studs 30 which are regularly spaced, the distance between two consecutive studs being equal to the distance between the axes of two successive electromagnets 18 on the band 12. Between each stud 30, the band 25 is provided with a hole 31 intended to receive studs 32 secured to the periphery of the plate 28 and thus to insure the driving of the plate 28. On each of the studs 30, is mounted a cop 33 having the form of a small sheave, each of the cops being provided with a conical axially disposed recess 34. Counter-guide-blades, of which two are shown at 35 and 37 in Fig. 6, maintain the cops 33 on the roll 25 between the plate 28 and the point where the cops enter the shed, between the points where the cops leave the shed and the guide-pulley 27 and during the return between the pulley 27 and the plate 28.

Figure 9:
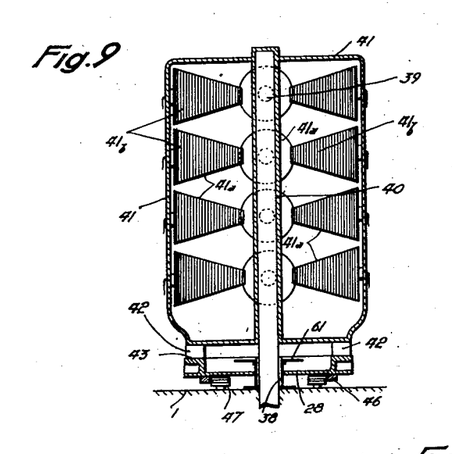
Fig. 9 is a diagrammatical sectional view of the whole cop winding machine.

A shaft 39 is mounted on the frame 1 and projects through an axial aperture 38 formed in the plate 29 to provide support for a rotatable cylindrical body 41, the body having a centrally disposed socket 40 which receives the shaft 39. The body 41 has a connection with the plate 28 and in the form of the invention shown in Fig. 9, the connection between the body and the plate comprises resilient blades 42. Mounted in the body 41 are bobbins 41a which carry threads 41b intended to constitute the weft, the bobbins being arranged in a known manner so that the threads 41b unwind through their axes.

The plate 28 includes an external flange 43 and is guided in its rotation through an annular rail 46 which cooperates with rollers 47 rotatably mounted in the frame 1.

Figure 7:
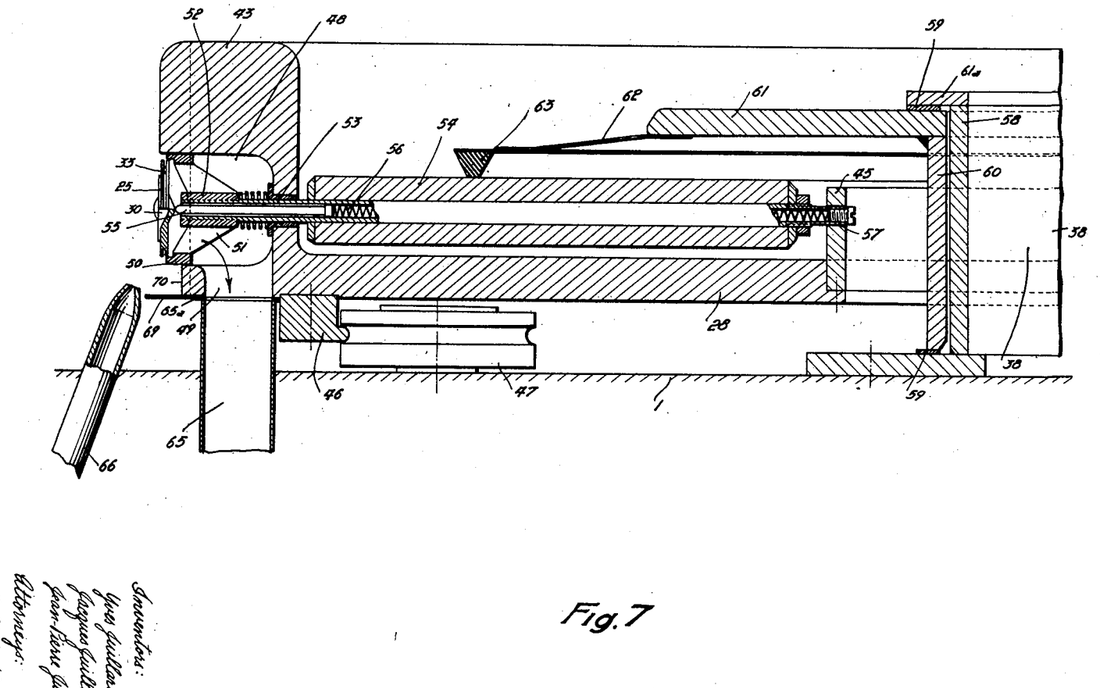
Fig. 7 is a diametral sectional view of the plate shown in Fig. 6.
Figure 8:
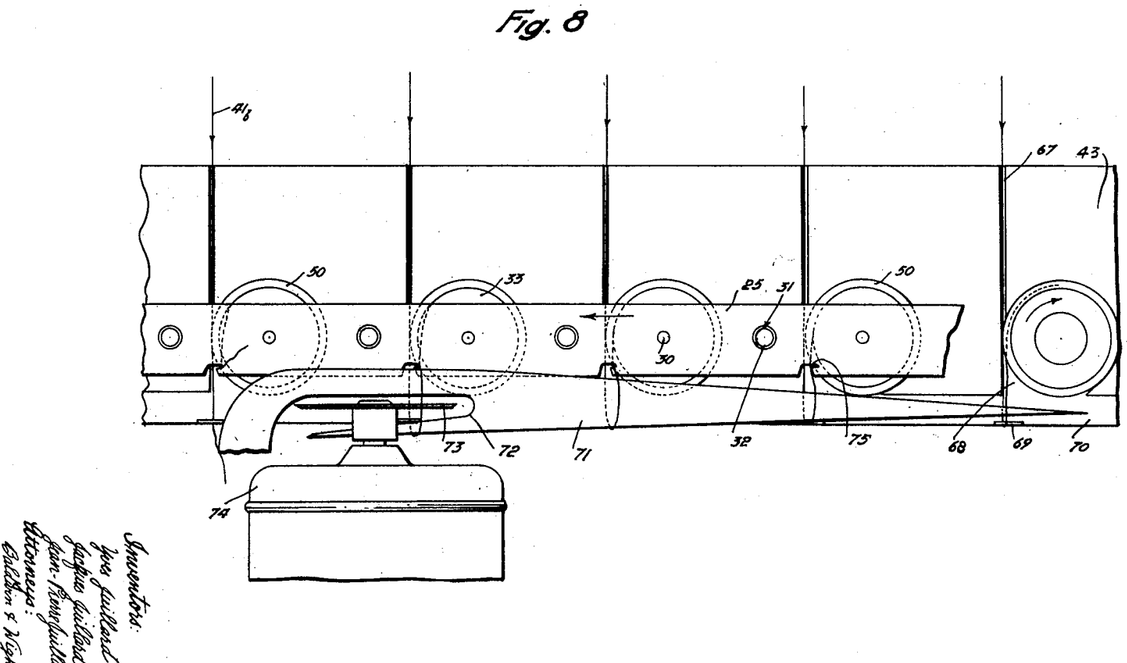
Fig. 8 is a partial side elevational view of the plate shown in Figs. 6 and 7.

Arranged on the periphery of the flange 43 (Figs. 6 to 8) and at angular intervals which correspond to the distance between two cops 33 on the band 25, are recesses 48, each communicating through a passage 49 with the lower face of the plate 28. Rotatably mounted with a sliding fit in each of the recesses 48, is an annular member 50 designated herein as the "loader" and connected through arms 51 with a hub 52 clamped on a hollow shaft 53 arranged radially with respect to the plate 28 and rotatably mounted in bearings provided in the flange 43 and in the flange 45. Between the flanges, each shaft 53 carries a cylinder 54 the outer surface of which is covered with rough material, e. g. emery, the cylinder being clamped on the shaft 53. Slidably mounted in the latter is a piston 55 urged radially outwardly of the plate 28 by one end of a spring 56, the other end of which rests upon a plug 57 screwed into the inner end of the shaft 53.

Arranged in the aperture 38 of the plate 28 and concentrically to the latter is a cylindrical sleeve 58 fast with the frame 1 and on which a ring 60 carrying a sector-shaped plate 61 is rotatably and rigidly mounted by means of washers 59. The plate 61 itself carries a sloped rubber member 63 by means of resilient blades 62 capable of biasing the slope 63 into engagement with the emery cylinder 54.

A similar plate 61a is carried by the sleeve 58 and supports, by means of resilient blades 62a, a rubber slope 63a similar to slope 63, slopes 63 and 63a being so arranged as to be able to be placed side by side at one of their ends.

A lever 64, fast with ring 60 makes it possible to shift the latter by rotation around sleeve 58 thereby moving the plates 61 and 61a more or less nearer to each other, the effect of which is to extend or to shorten the effective total operative length of the slopes 63 and 63a, as will be more fully explained subsequently.

A suction tube or conduit 65 communicates with the open passage 49 below the plate 28 through a flexible joint 65a and extends around the plate 28 in an arc corresponding substantially to the arc of the band 25 where it is trained around the periphery of the plate 28. A conduit 66, connected to a tube or source of compressed air opens vertically below the periphery of the plate 28 at some distance ahead of the point where the band 25 engages the latter.

At the edge of the plate 28 and in its flange 43, are provided vertical grooves 67 in communication with and flaring as at 68 below the recesses 48. A small plate with an eye 69 is secured to the lower part of the plate 28 in vertical alignment with the grooves, the part 70 being slightly set back with respect to the periphery of the flange 43. A needle 71 having one end secured to the frame 1 has its other end, which forms a sharp point, in contact with the outer part 70 of the plate 28. The point of the needle is located below the level of the band 25 in the neighbourhood where the band 25 leaves the plate 28. In the neighbourhood of its end which is secured to the frame 1, the needle 71 is provided with a recess 72 into which a rotating knife is received, the knife comprising a cutting disc 73 clamped on the shaft of the driving motor 74.

Notches 75 having a nose are provided in the lower edge of the band 25, each of the notches being arranged opposite the periphery of a cop 33 carried on the band 25 and forwardly of the cop in the direction of movement of the band.

Figure 4:
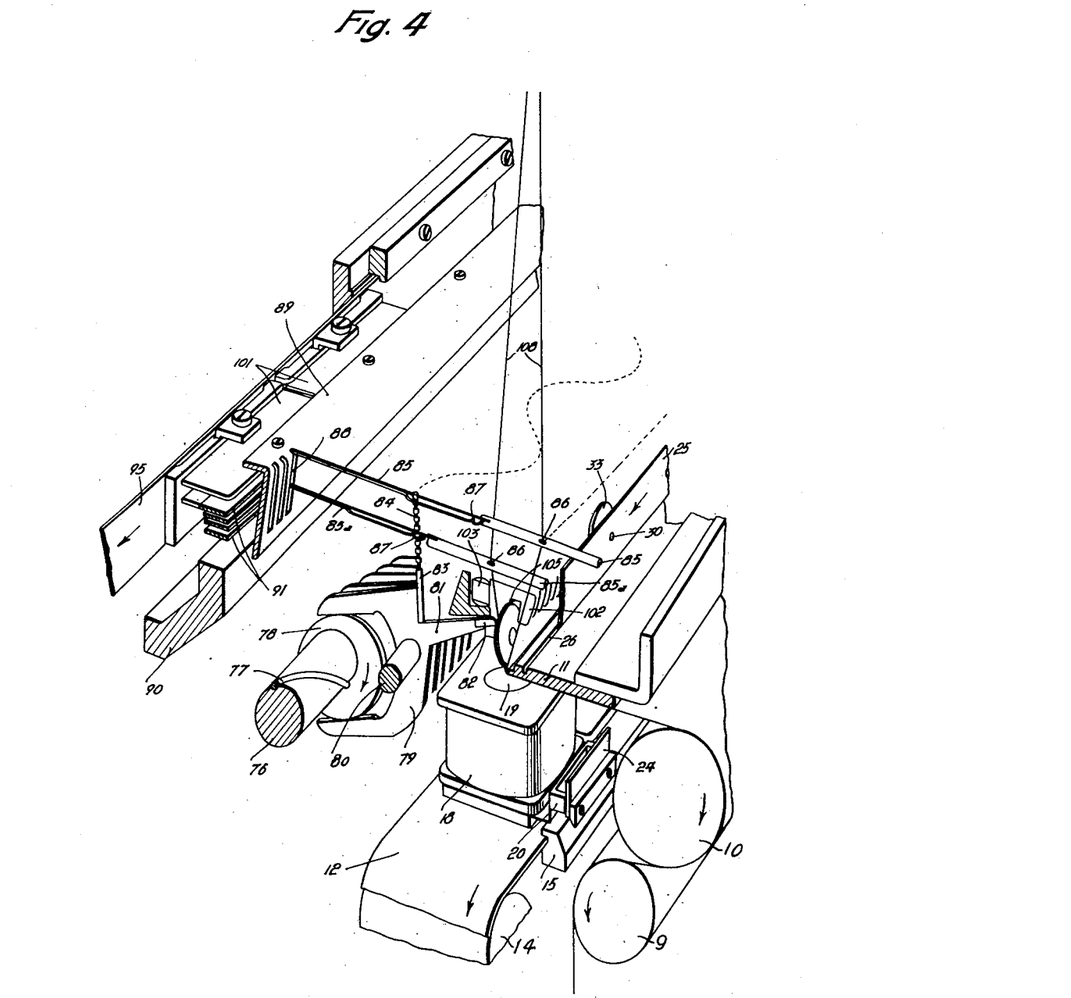
Fig. 4 is a perspective view from the front of the exit of the cops of the warp and of the dobby.

Arranged between the rear part of the frame 1 and the cross plate 11 (Figs. 4 and 5) is the dobby which will be described hereafter.

The illustrated embodiment of the invention represents a loom having nine shafts of healds. The dobby comprises a longitudinal shaft 76 rotatably mounted at each of its ends in bearings which are fast with frame 1 and on which shaft a series of eccentrically mounted plates 78 functioning as cams are clamped by means of a helical key 77, the pitch of which is equal to the distance between two cops on band 25. With each of these cams cooperate both arms of a fork 79 pivotally mounted around a shaft 80 fast with the frame 1. Each fork 79 comprises, on one side, a nose 81 terminating in a ramming blade 82 capable of engaging between the warp threads and, substantially ninety degrees removed from nose 81 is a rod 83 which comprises, in the illustrative embodiment, nine narrower parts such as 84. Each rod 83 is intended for the actuation of nine healds such as 85, 85a. Each of these healds comprises a blade provided with a hole 86 for the passage of a warp thread and a control rod provided with a resilient hook 87 capable of engaging onto the corresponding narrower part 84 of the rod 83 to maintain the heald fast with the rod. The rear end of the heald actuating rod 85, 85a corresponding to one and the same rod 84 is received in a guiding window 88 provided in a plate 89 fast with a cross piece 90 of the frame 1. This cross-piece 90 also carries a series of eight horizontal guiding blades 91 leaving between them a sufficient space for the passage of the actuating rods.

Arranged behind the cross-piece 90, is a second cross-piece 92 fast with the frame 1 and comprising a guide 93 for the return side of the band 25 and a guide 94 for an endless band 95 which runs in synchronism with the band 25 and which is trained around two driving pulleys 96 and 97 rotatably mounted around vertical axes on the frame 1. Secured on the band 95 are stirrups 98 which comprise nine superposed horizontal grooves 99 in which can be secured, by means of a screw 100, blades 101 capable of projecting into alternate slots of guide blades 91. The length of the blades 101 is equal to the distance between two cops 33 on the band 25. A crosspiece 90a is arranged toward the front of the loom above the plate 11 in order to serve as a stop for the healds 85a.

A guiding reed formed of vertical blades 102 arranged so as to engage between the warp threads and secured in a common support 103, rests upon a cross-piece 104 of the frame 1, each blade 102 being provided with a notch 105 intended to guide the cops 33 into the shed. Furthermore, the blades 102 include a step 106 in which the upper edge of the band 25 is guided during that part of its travel in which its lower edge is guided in the groove 26 of the plate 11.

Plate 11 carries at the entrance end of the band 25, a needle 107 having its point in engagement with the band 25 on a level corresponding to the top of the notches 75 provided in the lower edge of the band.

The operation of the illustrated loom is as follows:

The warp beam 3 which carries the warp threads is mounted between the arms 2. After its passage on the reversing rolls 4 and 5 and in the warp stop motion device 6, the warp 108 is engaged in the reed 102 whereafter it passes below the plate 11, around the pulling roll 10, around the reversing roll 9 and is finally wound onto the roll 8 which receives the finished fabric. In order to simplify the description, it will be assumed that the cops 33 arranged on the studs 30 of the band 25 in that part of the band which is between the plate 28 and the warp threads, each carries a length of thread substantially equal to the width of the fabric to be woven, the free end of the thread which is thus wound on each cop being engaged, as will be explained hereinafter, in the nose of the notch 75 corresponding to the cop under consideration. The driving motor of the loom being started, the bands 12 and 25 move in the directions indicated by the arrows in Fig. 1. When a cop carried along by the band 25 reaches the end of the needle 107, the latter catches the free end of the weft thread wound on said cop and tends simultaneously to move the cop away from the band 25. When it comes in front of the V of the shed, opened by the dobby as will be explained later on, the free end of the weft thread is retained below the needle 107 whereas the shuttle under consideration is separated from the stud 30 of the band 25 and penetrates into this V, the band moving further on the outside of the shed. From this moment, the cop is carried along under the influence of the attraction of the magnetic field of the electromagnet 18 which is immediately below the cop, but outside of the V and the cop rolls into the bottom of the V of the shed while depositing the weft thread which it carries. The same operations are repeated for the following cop and so on, the shed being crossed or not crossed behind each cop in the measure as it moves forward, by the action of the dobby, as will be explained later on.

At the same time, the ramming blades 82 move downward, whereafter they rise again behind each cop in the measure as the latter moves forward while ramming in the bottom of the V the weft thread deposited by the cop. When a cop has thus moved through the whole width of the shed, it is taken again between the band 25 and a counter-guide similar to guide 35—37, the conical recess 34 of the cop being disposed over the stud 30 which it has left when the cop had entered the shed. At the same time, the cop is released by the electromagnet 18 which formerly carried it along, since the current supply to the electromagnet is switched off owing to the contact being broken between the blades 21 and the plate 22 of the following electromagnet.

The empty cop is thus carried along by the band 25 and follows the return movement of the latter towards the plate 28.

Each weft thread 41b carried by the bobbins 41a in the cage 41 which is mounted above the plate 28 moves vertically downwardly along the cage and is received before the loom is started, in one of the grooves 67 provided on the periphery of the flange 43 of the plate 28 and in the corresponding plate with an eye 69. When, owing to the rotation of the plate 28, a thread 41b is situated opposite the blowing conduit 66, immediately before the point where the band 25 comes into contact with the plate 28, the free end of the thread 41b which projects below the eye plate 69 is blown upwardly and at the same time sucked into the corresponding recess 48 of the plate 28, the bore 49 which communicates with the recess having come to coincide with the sucking conduit 65. Immediately thereafter, an empty shuttle carried along by the band 25 comes in front of the recess 48 under consideration and since it is no longer restrained by the counter-guide 37 it is applied, under the combined action of the sucking and of band 25, against the loading ring 50 while displacing the piston 55 against the action of the spring 26, the end of the weft thread 41b being placed between the ring and the cop. Upon further movement of the plate 28, the corresponding emery cylinder 54 rubs against the rubber covered slope 63 which causes rotation of the hollow shaft 53, the loading ring 50 and the cop 33. It results therefrom that the thread 41b under consideration is wound on the cop. Owing to the arrangement of the slope 63, the rotary movement of the cop is first slow and then accelerated little by little till the moment when the slope 63 is at the maximum distance from the center of the plate 28. The speed of rotation then remains constant, whereafter it diminishes again till the moment when the emery covered roll 54 leaves the slope 63. The duration of this rotation is such that the length of the weft thread 41b wound on a cop is equal to the length of thread which is necessary for forming a weft thread. It may be adjusted by acting upon the lever 64 so as to cause the ring 60 to pivot on the sleeve 58 thereby shifting the point where each emery covered cylinder 54 comes into contact with the slope 63. Shortly before the end of the rotation of the cop by means of the slope 63 and the cylinder 54, the point of the needle 71 penetrates into the loop formed by the downwardly moving side of the thread 41b and that side of the same thread which rises again passes from the eye plate to the shuttle. The outer side of this loop is guided by the needle 71 until the cutting disc 73 cuts it, thus leaving free again the end of the thread 41b which projects through the eye plate 69. At the same time, the inner thread of the loop, which is a continuation of the thread wound on the cop 33, is received in the nose of the corresponding notch 75. The cop under consideration is then loaded and ready for repeating the same run in order to deposit a new weft thread into the shed.

Figure 5:
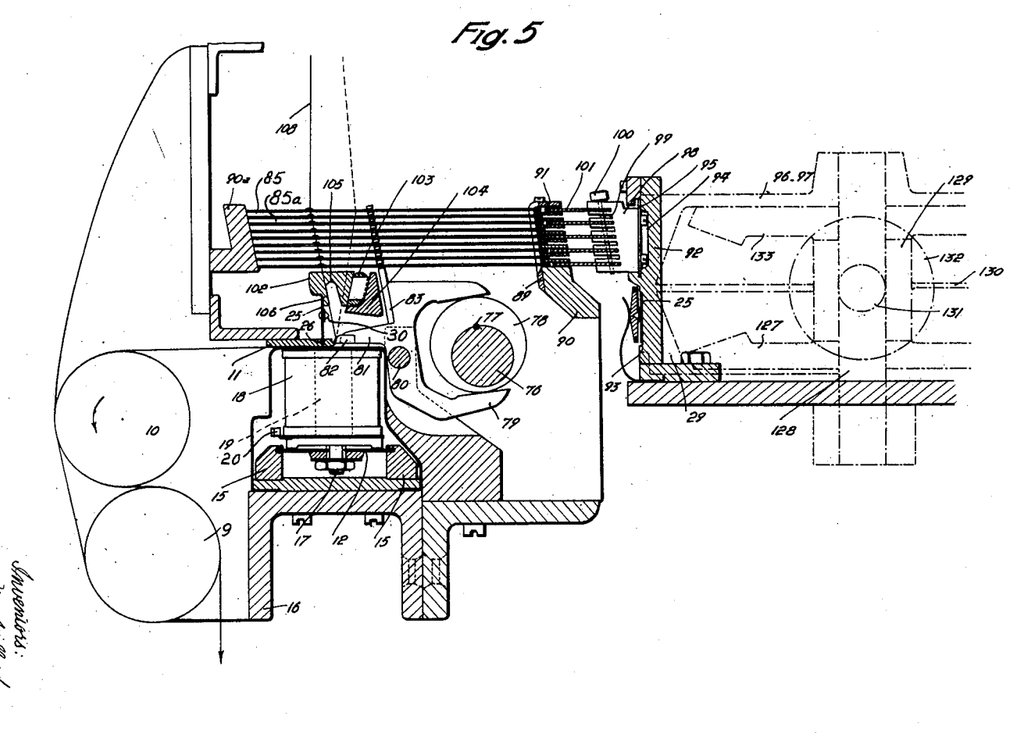
Fig. 5 is a partial cross-sectional view taken in the neighbourhood of the middle of the loom.

For opening and closing the shed, the dobby operates as follows:

In the following description a single cop 33 in movement in the shed will be considered, but it will be understood that all cops operate in the same manner. When this cop arrives before the shed, the rod 83 which actuates the first nine healds 85, 85a will have been placed in a position by the cooperation of the cam 78 and the fork 79 which is at the rear of the loom, the blade 82 carried by the corresponding arm 81 being lifted out of the shed. Rearward movement of the rod 83 causes rearward movement of the heald 85a which is fixed to the rod 83 by the hook 87. As is shown in Fig. 5, the healds 85a are free to move rearwardly through a guiding window 88 in the plate 89 because at the levels corresponding to the levels of the healds 85a, the horizontal guides 91 are unobstructed by blades 101. The healds 85 are not carried rearwardly by rod 83 because at the levels of the healds 85, the openings between the corresponding guides 91 are blocked by blades 101. The healds 85, therefore, remain in their original position, the rod 83 being released from the hook and sliding freely in the space between the forked ends of the healds 85. As a result of the operation just described, the shed is opened, all of the warp threads which are engaged by a heald 85a being seized and drawn rearwardly, whereas the warp threads which are engaged by the healds 85 remain in their original position. As the cop moves forward in the shed, the rotation of the shaft 76 and of the cams 78 clamped on this shaft causes rocking movement of the forks 79 toward the front of the loom. The healds 85a which were moved rearwardly by the first rod 83 are brought forwardly again in order to close the shed after passage of the cop. At the same time, the following cams 78 act upon the corresponding forks to open sheds in front of the cop. The same movements are effected for the following cops, the movement of the healds being controlled through the small blades 101 which correspond to the latter cops, and the arrangement of these small blades may be different from that of the blades 101 which correspond to the preceding cop. It is to be understood that it is possible to weave as many as nine different patterns by suitably arranging the blades 101 in the successive stirrups 98.

Figure 10:
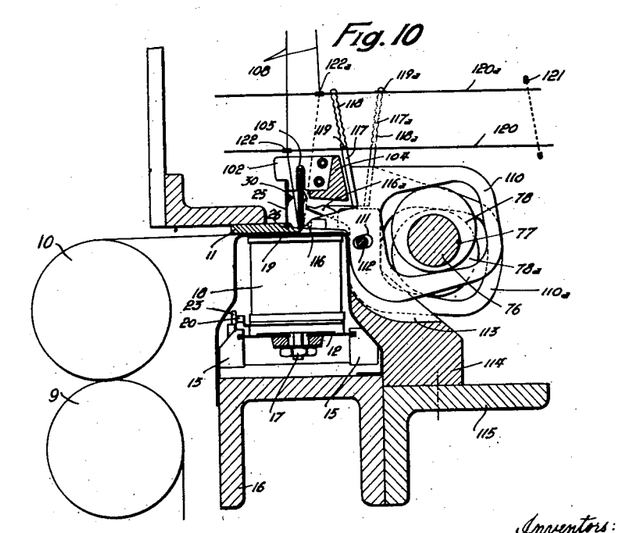
Fig. 10 is a sectional view similar to that of Fig. 5, showing a modification of the construction of the dobby.
Figure 11:
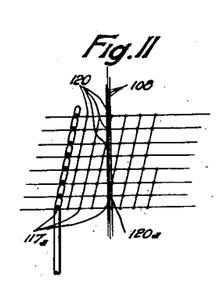
Fig. 11 is a diagrammatical frontward view of the loom, showing the arrangement of the warp threads and of the healds in the case of a dobby made in accordance with the disclosure of Figure 10.

When it is desired to weave only cloth, it is possible to use a simplified dobby which operates more simply than the one just described. This simplified dobby, which is shown in Figures 10 and 11 comprises a rotatable longitudinal shaft 76 driven by the driving motor of the looms and on which cam plates 78 and 78a are clamped eccentrically by means of a helical key 77. In the form shown, the pitch of the helix formed by the key 77 corresponds to the distance of three consecutive cops instead of two as before. The successive plates 78 and 78a are clamped on the shaft 76 substantially 180° out of phase with respect to one another. Each plate 78 cooperates with a frame 110 which replaces the fork 79 of the previously described embodiment, and each cam 78a cooperates in the same manner with a frame 110a. The frames 110 and 110a are linked by means of a shaft 112 carried by separating plates 113 fast with a bar 114 bolted on a square 115 itself secured to the cross-piece 16 of the loom, the shaft passing through slots 111 in the frames. The frames 110 and 110a carry ramming blades 116 and 116a respectively capable of ramming, in the bottom of the V of the shed, the weft threads deposited by the cops. The diameter and the eccentric arrangement of the plates 78 and 78a, the inner dimensions of the frames 110 and 110a as well as the length of the slots 111 are so related as to impart to the ramming blades 116 and 116a an elliptical movement which permits the ends of the ramming blades to be horizontally withdrawn from the shed when they are at the bottom of their stroke. The frames 110 and 110a carry arms 117 and 117a respectively which are similar to the arm 83 carried by the forks 79 of the previously described embodiment. Each of these arms comprises eight constrictions such as 118—118a on each of which a loop 119 or 119a is clamped, the loop being formed in a rod-like heald 120 or 120a the rear end of which is guided in a rack 121 carried by the frame of the loom. That part of the arms 117—117a which comprises the constrictions 118—118a is inclined, as indicated in Fig. 11, in such a manner that each of the eight healds 120 carried by an arm 117 are inserted between two healds 120a carried by the arms 117a which lie on either side of the arm 117. For the sake of clarity, Figure 10 shows only one heald 120 and one heald 120a and Figure 11 shows only a single arm 117, the other arms 117 and 117a being represented by a simple stroke; a single heald 120a sandwiched between two healds 120, the healds being viewed endwise and shown by points.

The successive warp threads alternately pass through an eyelet 122 of a heald 120 and through an eyelet 122a of a heald 120a. The cops are guided in a vertical plane through a reed formed of blades 102 each of which is provided with a notch 105 and secured to a cross-piece 104 in a manner similar to the embodiment previously described.

As a cop approaches the shed, the cams 78 and 78a cause the arms 117 to be tilted forwardly whereas the arms 117a are tilted rearwardly to open the shed in front of the cop. After the cop has passed the arms 117 and 117a, the warp threads are crossed behind the cop by the rocking of the frames 110, 110a which in the instant embodiment moves the arms 117 to the rear whereas the arms 117a are brought to the front with the ramming blades following the corresponding movements. In this arrangement, the cops of odd order, for example, roll upon the noses of the ramming blades 116, the ramming blades 116a being lifted, whereas the cops of even order roll upon the noses of the ramming blades 116a, the blades 116 then being lifted. The successive weft threads are thus alternately deposited on the noses of the blades 116 and on the noses of the blades 116a which renders necessary the horizontal withdrawing movement of the latter.

It is possible to omit the ramming blades 82 or 116—116a, inasmuch as the ramming of the weft threads may be accomplished by the passage of the cops themselves which then would be made somewhat heavier than would be required in the illustrated embodiments.

The movement of the various movable members of the above described looms may be accomplished as follows:

The pulling roll 10 is driven by the general motor of the loom through the medium of a Cardan transmission 123 at the head of which a reduction gear (not shown) is arranged. The fabric roll 8 is rotated by the pulling roll 10 through the medium of a friction transmission of a known type, not shown.

The shaft 76 of the dobby is driven in the same manner as the roll 9 through the medium of a Cardan transmission 124. The shaft 76 carries at its opposite end a conical pinion 125 which drives a toothed ring 126 fast with the pulley 27 which drives the band 25 conveying the cops. This band rotatably drives the plate 28 with the cop winding machine frame 41 by means of the studs 32 carried by the said plate 28 which are received in the holes 31 provided in the band 25. This band also drives by means of studs carried by the idler 29 and being received in the holes 31 of the band 25, the idler 29 which is fast with a toothed ring 127, the assembly being rotatably mounted on a shaft 128 carried by the frame of the loom. Mounted on shaft 128 is a collar 129 fast with the frame 1 of the machine through an arm 130. The collar carries trunnions 131 on which two conical pinions 132 are mounted, one of which meshes with the toothed ring 127 and the other of which meshes with a toothed ring 133 fast with the wheel 96 which drives the band 95 carrying the stirrups 98 in which the heald locking blades 101 are secured, the wheel 96 being loosely rotatably mounted on the shaft 128.

This latter mechanism which is represented in chain dotted lines in Figure 5 makes it possible to insure the movement of the band 95 at the same speed as the return side of the band 25 and in the reverse direction with respect to the latter, that is to say in synchronism with the outgoing side of said band 25.

Figure 12:
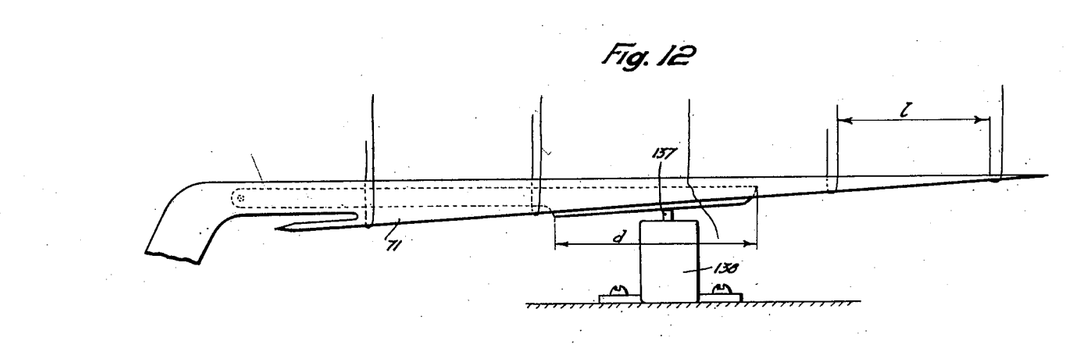
Fig. 12 is a detail elevational view showing a device for the control of the cop winding in the alarm position.
Figure 13:
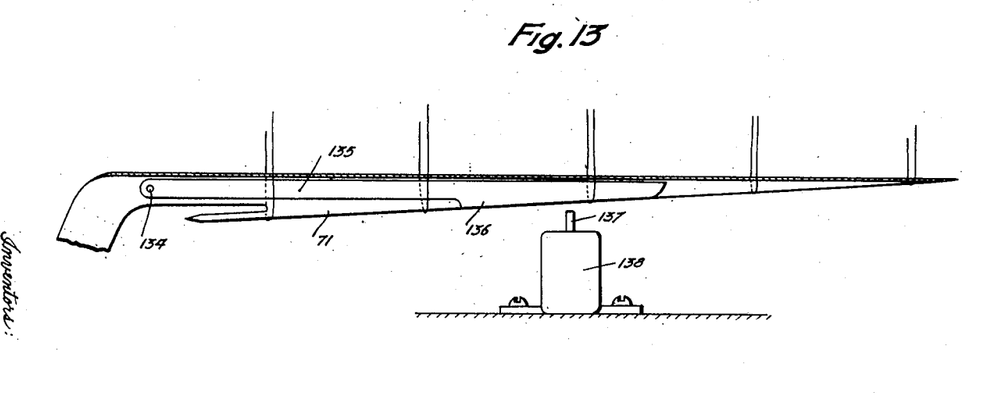
Fig. 13 is a longitudinal sectional view of the same device in another position.
Figure 14:
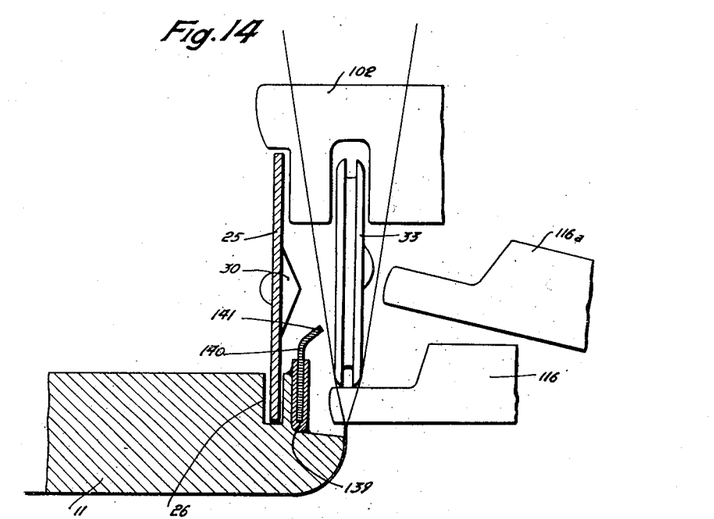
Figs. 14 and 15 are two partial sectional views of the control device for the working of the cops in two working positions.
Figure 15:
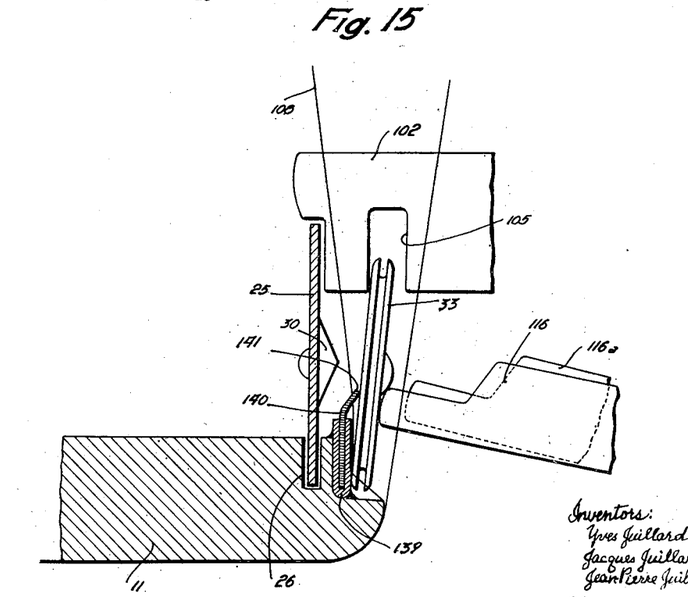
Figure 16:
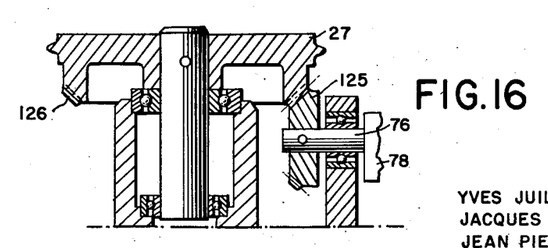
Fig. 16 is a detail sectional view on the line 16—16 of Fig. 1, on an enlarged scale.

Beside the warp stop motion device arranged between the rolls 4 and 5, the loom may include various control devices and more particularly a device for controlling the supply of weft threads, which device is shown in Figures 12 and 13, and a device for controlling the correct position of the cops inside the shed, which device is shown in Figures 14 and 15.

For controlling the supply of weft threads, the needle 71 which guides each weft thread towards the rotary cutter 73 is formed of a hollow U-shaped iron section inside which is linked, around an axis 134, an arm 135 provided at its end with an enlarged part 136 capable of yielding inwardly or of projecting outwardly with respect to the needle 71 while acting, in the latter position, on the finger 137 of a switch 138 inserted in the circuit of the motor driving the loom. The length of the enlarged part 136 of the arm 135 is larger than the distance between two consecutive weft threads, that is to say between two consecutive grooves 67 of the plate 28 but smaller than twice that distance. If the weft threads are correctly wound on the cops without interruption the loops formed by the threads between the eye lugs 69 and the cops carried by the plate 28 engage the needle 71 as previously explained and maintain the lever 135 (Fig. 13) permanently lifted. If, on the contrary, a weft thread breaks, it no longer forms a loop in the lower part of the plate 28 or the loop is at least not stretched and during the passage of the thread at the place where the enlarged part 136 of the arm 135 is located, the latter is no longer supported and it falls on the finger 137, thus causing the switch 138 to be actuated to stop the motor. An alarm device may be provided and actuated by the switch 138 at the same time as the latter stops the motor which drives the loom.

If a loop or a knot forms on a warp thread this defect may stop a cop during its passage in the shed, this cop then being "released" from the electromagent with which it was associated. In order to insure the automatic stopping of the loom in such a case the device shown in Figures 14 and 15 may be used; these figures showing, by way of example, the embodiment of a loom provided with a dobby of the type shown in Figs. 10 and 11, it being understood that the arrangement would be identical for a loom provided with a dobby of the type shown in Figs. 4 and 5. In Figs. 14 and 15, there is shown the longitudinal plate 11 with its groove 26 for guiding the cop carrying 25, a cop 33 in the shed, the reed 102 and the ramming blades 116—116a. On the longitudinal blade 11 is secured, through the medium of an insulating jacket 139, a continuous blade 140, the edge 141 of which is provided with saw teeth and inclined towards the shed. This blade 140 is connected with one of the terminals of an alarm circuit, not shown, which may comprise a relay acting upon a switch interrupting the drive of the loom, the other terminal of the circuit being connected with each of the blades 116 and 116a. In normal operation the blades 116 and 116a engage behind the cops after their passage (Fig. 14). If a cop is arrested in the shed either through one of the above mentioned defects or for any other reason at least one blade 116 will, during its forward movement between the warp threads, come to strike against the arrested cop and force it against the edge 141 of the blade 140 (Fig. 15) thus closing of the alarm circuit and possibly stopping of the loom.

What we claim is:

1. A loom for the manufacture of fabrics having a given weft width, which comprises a frame, a warp beam pivotally mounted on a horizontal shaft in the upper part of the said frame and adapted for receiving warp threads wound side by side on the said warp beam while forming a sheet of warp threads having two side ends encompassing a width equal to the said weft width, a roll receiving the woven fabric and pivotally mounted to turn around a horizontal axis in the lower part of the frame, means for guiding the warp threads between the said warp beam and the said receiving roll and comprising a horizontal ruler having a rectilinear edge, the said guiding means being adapted for giving to the said warp threads a substantially vertical trajectory above the said ruler and a substantially horizontal trajectory below the said ruler, a plurality of healds movable substantially horizontally and perpendicularly to the said sheet of warp threads and arranged side by side above the said ruler in order to control the movement of the said warp threads, means for controlling the movement of the said healds whereby given warp threads are pushed forwardly, whereas the other warp threads are inserted between the said given warp threads and pulled back and alternately in a reciprocatory movement the said given warp threads are pulled back, whereas the other warp threads are pushed forwardly, the said given and other warp threads thus forming a succession of openings in the shape of vertical V's the point of which is located on the rectilinear edge of the said ruler, a plurality of cops adapted to receive a length of weft thread which is slightly larger than the width of the said sheet of warp threads, means for introducing the said cops successively one after another into the said V-shaped openings formed through the warp threads at one of the ends of the sheet of warp threads, means for displacing the said cops longitudinally one behind another in the said openings on the whole length of the said sheet, means for extracting the said cops one after the other at the other end of the said sheet, and means for holding fast the thread carried by each cop when the said cop enters the said V-shaped openings, wherewith the thread carried by each cop is unwound in the said V-shaped openings in the measure as the said cop moves forwardly, the control means for the said healds being arranged so that the reciprocatory movement of the given and other warp threads takes place in the measure of the progression of each cop and immediately behind each cop.

2. A loom as claimed in claim 1, in which the means used for guiding the warp threads from the warp beam to the lower receiving roll consist of two guiding rolls arranged parallel above the warp beam and in the neighbourhood of the latter parallel with the same and a warp stop motion arranged below the said guiding rolls, a reversing roll and a pulling roll arranged parallel with the said lower roll above and near the latter, said ruler being arranged below the said warp stop motion in the vertical of the latter and substantially in the horizontal level of the said reversing roll.

3. A loom as claimed in claim 1, including heald supports slidably mounted side by said on the frame of the loom and respectively carrying said healds, a cam shaft rotatably mounted on said frame and extending parallel with said ruler, cams supported side by side on said shaft and being cooperable respectively with said heald supports, and means for rotating said shaft.

4. A loom as claimed in claim 3, in which the healds are maintained resiliently on the said heald supports, movable stops cooperable with said healds for limiting the movement of the healds towards the rear, means for carrying along the said stops parallel with the cops and at the same speed as the latter, the cams cooperating with the heald supports being substantially identical, circular cams arranged out of centre on the shaft which supports the said cams, each cam having a part of a maximum radius substantially diametrically opposed to a part with a minimum radius and the said cams being clamped on the said shaft in such a manner that the part with a minimum radius of a cam is shifted angularly with respect to the part with a maximum radius of the preceding cam whereby the said parts with a maximum radius of the totality of the said cams are arranged like a helix around the said shaft.

5. A loom as claimed in claim 3, in which the cams cooperating with the heald supports are substantially identical circular cams arranged out of centre on the shaft which supports the said cams, each cam having a part with a maximum radius substantially diametrically opposed to a part with a minimum radius, the said cams being clamped on the said shaft in order to form a succession of odd cams and of even cams and in such a manner that the part with the maximum radius of an odd cam is angularly shifted with respect to the part with a maximum radius of the preceding odd cam, whereby the parts with a maximum radius of the totality of the said odd cams are arranged like a first helix around the said shaft and that the part with a maximum radius of an even cam is substantially diametrically opposed to the part with a maximum radius of the immediately preceding odd cam whereby the parts with a maximum radius of the totality of the said even cams are arranged like a second helix substantially diametrically opposed to the said first helix around the said shaft.

6. A loom as claimed in claim 1, in which the cops are formed of circular discs having a peripheral annular groove adapted to receive the said length of weft thread.

7. A loom as claimed in claim 1, in which the cops are formed of circular discs made of magnetic metal and having a peripheral annular groove adapted to receive the said length of weft thread, the means for displacing the said cops in the openings formed by the sheet of warp threads comprising two rollers rotatably mounted in the frame of the loom to turn around horizontal axes perpendicular to the rectilinear edge of the said ruler, the said rollers being arranged in one and the same plane at both ends of the said ruler and immediately below the rectilinear edge of the said ruler, means for rotating at least one of the said rollers, a flexible endless band made of a substantially extensible material passing around the said rollers and extending between the said rollers below the said rectilinear edge of the said ruler, electromagnets supported at intervals on the said band and having each a core secured substantially perpendicularly on the said band and adapted to pass below the said rectilinear edge of the said ruler, and means for energizing the said electromagnets.

8. A loom as claimed in claim 1, in which the cops are formed of circular discs having a peripheral annular groove adapted to receive the said length of weft thread and provided with an axial bore, and in which the means used for introducing the cops into the openings formed by the sheet of warp threads and for extracting the said cops from said openings comprise a flexible endless band which is substantially non-resilient and movable in a substantially horizontal plane, studs secured at intervals on one face of the said band and adapted to penetrate into the said axial bore of the cops, guiding means adapted to bring the said band into alignment with the said sheet of warp threads at one of the ends of the said sheet on a level immediately above the rectilinear edge of the said ruler in order to cause the said band to pass along the said sheet and parallel with the same inside the V-shaped openings formed by the said sheet with the face of the said band carrying the said studs being directed toward the said sheet, and to bring the said band into alignment with the said sheet of warp threads at the other end of the said sheet, counter-guiding means extending along the face of the said band which carries the said studs on the whole trajectory of the said band except the part of the trajectory which extends along the said sheet of warp threads, the said counter-guiding means being adapted to maintain the said cops on the said studs, and means for insuring a continuous uniform axial movement of the said band.

9. A loom for the manufacture of fabrics having a given weft width, which comprises a frame, a warp beam pivotally mounted on a horizontal shaft in the upper part of the said frame and adapted for receiving warp threads wound side by side on the said warp beam while forming a sheet of warp threads having two side ends compassing a width equal to the said weft width, a roll receiving the woven fabric and pivotally mounted to turn around a horizontal axis in the lower part of the frame, means for guiding the warp threads between the said warp beam and the said receiving roll and comprising a horizontal ruler having a rectilinear edge, the said guiding means being adapted for giving to the said warp threads a substantially vertical trajectory above the said ruler and a substantially horizontal trajectory below the said ruler, a plurality of healds movable substantially horizontally and perpendicularly to the said sheet of warp threads and arranged side by side above the said ruler in order to control the movement of the said warp threads, means for controlling the movement of the said healds whereby given warp threads are pushed forwardly, whereas the other warp threads are inserted between the said given warp threads and pulled back and alternately in a reciprocatory movement the said given warp threads are pulled back, whereas the other warp threads are pushed forwardly, the said given and other warp threads thus forming a succession of openings in the shape of vertical V's the point of which is located on the rectilinear edge of the said rule, a plurality of cops adapted to receive a length of weft thread which is slightly larger than the width of the said sheet of warp threads, means for introducing the said cops successively one after another into the said V-shaped openings formed through the warp threads at one of the ends of the sheet of warp threads, means for displacing the said cops longitudinally one behind another in the said openings on the whole length of the said sheet, means for extracting the said cops one after the other at the other end of the said sheet, means for holding fast the thread carried by each cop when the said cop enters the said V-shaped openings, wherewith the thread carried by each cop is unwound in the said V-shaped openings in the measure as the said cop moves forwardly, the control means for the said healds being arranged so that the reciprocatory movement of the given and other warp threads takes place in the measure of the progression of each cop and immediately behind each cop, and means for placing the said length of weft thread on each cop between the extraction of each cop out of the V-shaped openings formed by the said sheet of warp threads and the introduction of each said cop into the said openings.

10. An ordinary loom for the manufacture of fabrics having a given weft width, which comprises a frame, a warp beam pivotally mounted on a horizontal shaft in the upper part of the said frame and adapted for receiving warp threads wound side by side on the said warp beam while forming a sheet of warp threads having two side ends encompassing a width equal to the said weft width, a roll receiving the woven fabric and pivotally mounted to turn around a horizontal axis in the lower part of the frame, means for guiding the warp threads between the said warp beam and the said receiving roll and comprising a horizontal ruler having a rectilinear edge, the said guiding means being adapted for giving to the said warp threads a substantially vertical trajectory above the said ruler and a substantially horizontal trajectory below the said ruler, a plurality of healds movable substantially horizontally and perpendicularly to the said sheet of warp threads and arranged side by side above the said ruler in order to control the movement of the said warp threads, means for controlling the movement of the said healds whereby given warp threads are pushed forwardly, whereas the other warp threads are inserted between the said given warp threads and pulled back and alternately in a reciprocatory movement the said given warp threads are pulled back, whereas the other warp threads are pushed forwardly, the said given and other warp threads thus forming a succession of openings in the shape of vertical V's the point of which is located on the said rectilinear edge of the said ruler, a plurality of cops formed of circular discs made of magnetic material and provided with an axial passage having a peripheral annular groove adapted to receive the said length of weft thread, whereby the cops are successively introduced one after another into the said V-shaped openings formed through the warp threads at one of the ends of the sheet of warp threads and are extracted one after the other at the other end of the said sheet, a flexible endless band which is substantially non-resilient and movable in a substantially horizontal plane, studs secured at intervals on one face of the said band and adapted to penetrate into the said axial bore of the cops, guiding means adapted to bring the said band into alignment with the said sheet of warp threads at one of the ends of the said sheet on a level immediately above the rectilinear edge of the said ruler in order to cause the said band to pass along the said sheet and parallel with the same inside the V-shaped openings formed by the said sheet with the face of the said band carrying the said studs being directed toward the said sheet, and to bring the said band into alignment with the said sheet of warp threads at the other end of the said sheet, counter-guiding means extending along the face of the said band which carries the said studs on the whole trajectory of the said band except the part of the trajectory which extends along the said sheet of warp threads, the said counter-guiding means being adapted to maintain the said cops on the said studs, means for insuring a continuous uniform axial movement of the said band, two rollers rotatably mounted in the frame of the loom to turn around horizontal axes perpendicular to the rectilinear edge of the said rule, the said rollers being arranged in one and the same plane at both ends of the said ruler and immediately below the rectilinear edge of the said ruler, means for rotating at least one of the said rollers, a flexible endless band made of a substantially extensible material passing around the said rollers and extending between the said rollers below the said rectilinear edge of the said ruler, electromagnets supported at intervals on the said band and having each a core secured substantially perpendicularly on the said band and adapted to pass below the said rectilinear edge of the said ruler, means for energizing the said electromagnets whereby the cops are shifted longitudinally one behind another in the said openings, means for holding fast the thread carried by each cop when the said cop enters the said V-shaped openings, wherewith the thread carried by each cop is unwound in the said V-shaped openings in the measure as the said cop moves forwardly, and means for placing the said length of weft thread on each cop between the extraction of each cop out of the V-shaped openings formed by the said sheet of warp threads and the introduction of each said cop into the said openings, the said means insuring a continuous axial movement of the band and the means which drive the said rollers carrying the said band as well as the control means for the said healds being synchronized in such a manner that the said band and the said strip move at the same speed in the same direction so that reciprocatory movements of the given and other warp threads take place in the measure of the progression of each cop and immediately behind each cop.

11. A loom as claimed in claim 10, characterized in that the means for placing the weft thread onto each cop comprise a vertical shaft fast with said frame, a circular horizontal plate pivotally mounted to turn around said vertical shaft, a socket pivotally mounted on said shaft, a vertical body fast with said socket, a plurality of elastic blades spaced from each other and connecting said vertical body to said plate, bobbins carrying thread pivotally mounted in said body, an external flange fast with said plate adapted to receive the said band driving the cops which passes around said external brim, said flange having at its periphery circular recesses arranged at intervals equal to the distance between two studs on said band and each communicating with the lower face of said plate, a plurality of hollow shafts mounted on and radially with respect to said plate and being aligned respectively with said circular recesses, a plurality of annular members respectively fast with said hollow shafts and respectively being frictionally mounted in said circular recesses and each having an inner bearing of a diameter substantially equal to the diameter of a cop, a rough surfaced cylinder clamped on each hollow shaft, a piston slidably mounted in each hollow shaft, a spring urging each piston radially outwardly with respect to said plate, a cylindrical sleeve fast with said frame and concentrically mounted with respect to said plate, a ring bearing a sector-shaped plate rotatively frictionally mounted on said cylindrical sleeve, a plurality of elastic blades carried by said sector-shaped plate, a plurality of sloped rubber members respectively carried by said elastic blades and being engageable with said rough surfaced cylinder, a second sector-shaped plate on said ring, a second plurality of elastic blades carried by said second sector-shaped plate, a plurality of sloped rubber members respectively carried by said second elastic blades, a radial lever fast with said ring, a suction tube extending over a predetermined arc and communicating with said circular recesses in said flange, a compressed air delivery tube opening vertically under the periphery of said circular horizontal plate, a plurality of vertical grooves in said flange respectively in communication with and flaring below said circular recesses, horizontal plates fixed to the bottom of said circular horizontal plate and respectively having eyes below the vertical parts of said grooves, a horizontal needle secured to said frame with its point in contact with the bottom of said circular horizontal plate, a horizontal groove being formed in said needle spaced from the point thereof, and a rotatable cutting disc extending into said horizontal groove.

References Cited in the file of this patent

UNITED STATES PATENTS

| | | |
|---|---|---|
| 1,295,196 | Patrick | Feb. 25, 1919 |
| 1,787,491 | Primavesi | Jan. 6, 1931 |
| 2,144,947 | Valentine | Jan. 24, 1939 |
| 2,218,608 | Hardy | Oct. 22, 1940 |
| 2,275,529 | Kinsella | Mar. 10, 1942 |
| 2,448,935 | Vanlaer | Sept. 7, 1948 |
| 2,506,315 | Petersen | May 2, 1950 |
| 2,519,786 | Paabo | Aug. 22, 1950 |
| 2,604,124 | Budzyna | July 22, 1952 |
| 2,728,884 | Pestarini | Dec. 27, 1955 |